J. L. BLACK.
FUEL SAVING DEVICE.
APPLICATION FILED JULY 3, 1918.

1,309,114.

Patented July 8, 1919.

Witness
O. P. Tucker

Inventor
John L. Black
By Helge Murray
his Attorney

UNITED STATES PATENT OFFICE.

JOHN L. BLACK, OF VALDOSTA, GEORGIA, ASSIGNOR TO OLIVER P. TUCKER, OF VALDOSTA, GEORGIA.

FUEL-SAVING DEVICE.

1,309,114.      Specification of Letters Patent.      Patented July 8, 1919.

Application filed July 3, 1918. Serial No. 243,120.

*To all whom it may concern:*

Be it known that I, JOHN L. BLACK, a citizen of the United States, residing at Valdosta, in the county of Lowndes and State of Georgia, have invented certain new and useful Improvements in Fuel-Saving Devices, of which the following is a specification.

This invention relates to certain new and useful improvements in devices for increasing the power of an internal combustion engine, and at the same time effect a substantial saving of fuel.

An object of the present invention is the production of a fuel saving attachment interposed between the exhaust and intake manifolds of an explosive type of engine, and adapted to present a relatively moistened, heated and air treated mixture to the fuel after its passage from the carbureter to the intake.

Another object of this invention is to produce a power increasing and fuel saving device for an internal combustion engine in which a specially treated uniform mixture of air is intermingled with the fuel for purposes of more effectually cracking or breaking the fuel and thereby obtain its maximum explosive qualities.

A further object of the invention is the production of a device for saving fuel and at the same time remove and prevent the formation of carbon in the cylinders of the engine.

A still further object resides in the production of a simple, durable and comparatively inexpensive device the use of which materially increases the efficiency of the explosive type of engine by insuring smoothness in running and a decrease in the wear of the several parts thereof.

In the drawings which illustrate an embodiment of my invention and in which corresponding reference characters designate similar parts:—

Figures 1, 2:
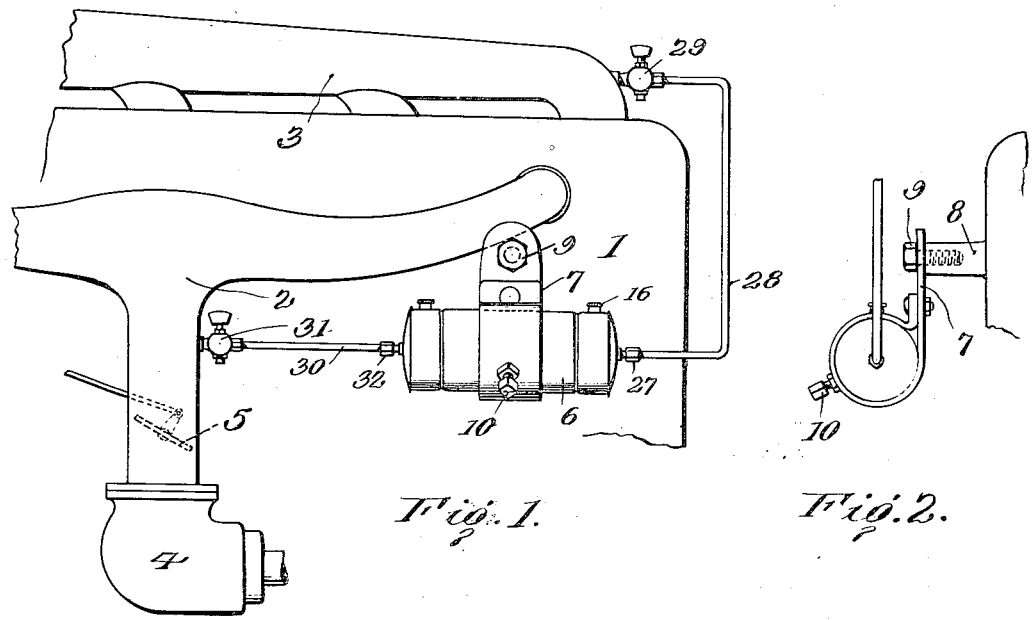
Figure 1 is a view in side elevation illustrating my improved device as applied to an internal combustion engine.
Fig. 2 is an end view of same.
Figure 3:
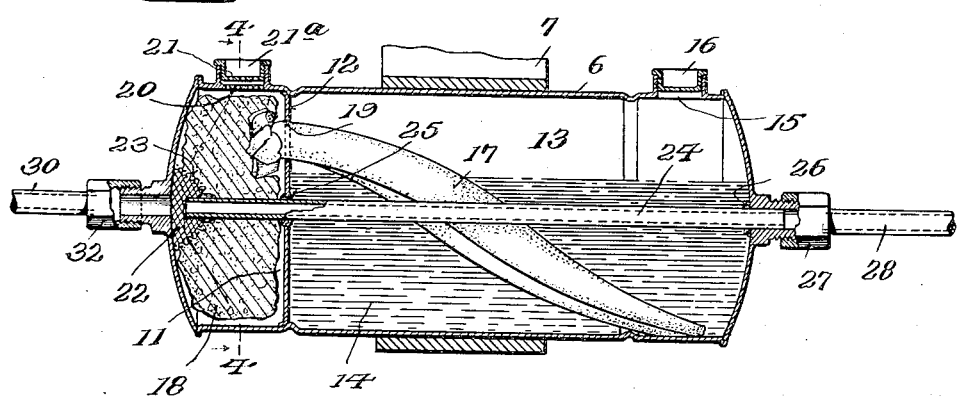
Fig. 3 is an enlarged longitudinal sectional view through my improved attachment.
Figure 4:
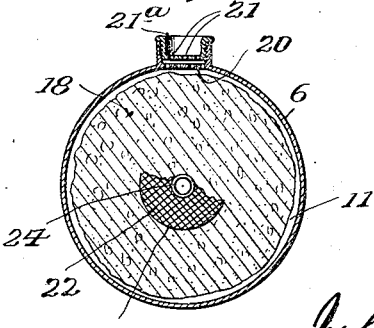
Fig. 4 is a transverse sectional view on the line 4—4 of Fig. 3.

The present invention comprises a water container supported from the engine; a conduit in the form of a pipe connected to the exhaust manifold and extending through the container to a moistened absorbent material such as felt or the like and adapted to conduct exhaust gases to a point in the container where they co-mingle with moistened fresh cool air drawn in from the atmosphere through the aforesaid moistened absorbent material; and another conduit in the form of a pipe leading from the container to the intake manifold of the engine above the carbureter and throttle valve for conducting the specially moistened and exhaust treated air to the fuel mixture being drawn into the cylinders.

Referring to the drawings:—My improved power increasing and fuel saving device is shown applied to an internal combustion engine 1, having the usual intake manifold 2 and exhaust manifold 3. The usual carbureter 4 and throttle or butterfly valve 5 are also shown.

The water container 6 is preferably supported in close proximity to the engine in a bracket 7 secured to an extension 8 of the engine by means of a bolt 9. A set screw 10 passes through the bracket and serves to hold the container in place within the same. This set screw may be eliminated and the container held within the bracket by a frictional fit. By this construction the container can be inverted for draining as will hereinafter appear.

The water container 6 is preferably made of copper or other suitable material, and is provided with a compartment 11 at one end thereof. This compartment is formed by the interposing of the partition 12, and the end wall of the container, both of which may be soldered in place after the interior portions of the device have been inserted.

A larger compartment 13 is formed at the other end of the container and receives a supply of water indicated at 14. This water compartment is filled through the opening 15 normally covered by the screw cap 16.

Extending from the water compartment is a wick 17 of fabric or other suitable material adapted to convey the water by capillary attraction to the absorbent material or felt indicated at 18. The wick 17 passes through an opening 19 in the partition 12, and is knotted to prevent its withdrawal. This knotted portion bears against and is partially embedded in the felt 18, thereby conveying the water to the said felt and maintaining it in a moist condition. The felt 18 substantially fills the compartment 11, thereby insuring the complete saturation of the fresh air with a moisture content.

In the upper portion of the compartment 11, a series of small openings are provided in a screen like plate 20. Through these openings, and other openings 21 formed in the screw cap 21ª fresh air passes into the compartment 11 and through the moistened absorbent material 18. The saturating of the fresh air with this moisture content serves to produce a readily usable oxygen capable of preventing the formation of carbon in the cylinders of the engine, and at the same time proportion the fuel mixture by reducing the amount of the gasolene used, and thereby increase the explosive quality of the mixture as presented to the engine cylinder. It will also serve to soften such deposits of carbon as may have accumulated, and effectually remove the same from the cylinder.

Co-mingling with this saturated fresh air within the compartment 11, and more especially at a small chambered portion of mixing station 22 thereof, is the stream of exhaust gases drawn from the exhaust manifold of the engine. The chamber or compartment 22 is formed by a screen of gauze 23 arranged in an arcuate form and soldered or otherwise suitably secured to the tube 24 extending through the container 6. The gauze in addition to forming a mixing chamber, also acts to prevent the separation of the felt by the suction of the engine, as will be readily understood.

The tube 24 is soldered to the partition 12 and end wall of the container is indicated at 25 and 26.

Communicating with the tube 24 by means of a detachable connection 27, is one end of a conduit or pipe 28, the other end of which is in communication with the exhaust gases passing through the exhaust manifold 3. A valve 29 is located in the conduit 28, and serves to regulate the amount of exhaust gases drawn into the tube 24.

The opposite end of the tube 24 terminates short of the end wall of the container in the chamber 22, at which point the exhaust gases meet the cool moisture laden fresh air.

From this chamber 22 through a detachable connection 32, a conduit 30 leads to the intake manifold of the engine above the throttle valve and carbureter as shown. Through this conduit the specially treated mixture of exhaust gases and moisture laden air passes to the fuel mixture entering the engine through the intake manifold. A valve 31 is located in the conduit 30, and serves to regulate the amount of treated air to be drawn into the manifold and mixed with the fuel.

In operation the water container is filled with water to about the level indicated after which the wick quickly transmits the same to the absorbent material 18. As the engine is operated the suction stroke of the piston will draw in a charge of the exhaust gases through the conduit 28 into the tube 24 delivering it to the chamber 22. At the same time a cool charge of fresh air is drawn in through opening 21, and thoroughly saturated with moisture as it passes through the absorbent material 18 into the chamber 22, at which point it co-mingles with the aforesaid warm air and passes outward through the conduit 30 to the intake manifold and further co-mingles with the fuel to break the latter up and bring out its maximum explosive qualities.

The valves 29 and 30 respectively, may now be adjusted to permit the delivery of the proper amount of specially treated air to the fuel.

By this construction it will be apparent that a uniform mixture of exhaust gases and moistened cool air can be maintained for successfully accomplishing the objects of this invention. It will also be seen that the saving of gasolene becomes material, in view of the large percentage of specially treated air used, and that it is the breaking up of this reduced amount of gasolene which gives the increased power to the engine.

It will also be apparent that the water container 6 can be readily drained by unfastening the connections 27 and 32, loosening the set screw 10, and inverting the container from which the water will drain upon the removal of the cap 16. This feature of the invention becomes useful when the invention is used and allowed to stand exposed to a freezing temperature.

From the foregoing, it will be obvious that I have produced a readily accessible attachment possessing advantages of increased speed, more mileage, increased power, reduction of heat, prevention of carbon, and economic consumption of fuel.

I claim:—

1. A device of the class described including in combination a combustion engine having a fuel intake and exhaust outlet, a container having a compartment adapted to receive a supply of water, another compartment in said container, an absorbent material in said second compartment, means for conveying water to said absorbent material from the first mentioned compartment, a mixing chamber in said second compartment, means for admitting exhaust gases from the exhaust outlet to said mixing chamber, means for admitting cool and moistened air to said mixing chamber, and a conduit for delivering the co-mingled mixture to the fuel intake.

2. A device of the class described including in combination a combustion engine having a fuel intake and exhaust outlet, a container having a compartment adapted to receive a supply of water, another compartment in said container, an absorbent material in said second compartment, means for conveying the water to said absorbent material for moistening the same, means including an opening in said second compartment for admitting cool air thereto for saturation with the moisture content of the absorbent material, means including a conduit passing through said container for admitting exhaust gases to the said second compartment from the exhaust outlet for mixture with the moistened cool air, and means for delivering the resultant mixture to the fuel intake.

3. A device of the class described including in combination a combustion engine having a fuel intake and exhaust outlet, a container having a compartment adapted to receive a supply of water, another compartment in said container, an absorbent material in said second compartment, a wick for conveying water to said absorbent material for moistening the same, a pipe extending through said absorbent material and adapted to admit exhaust gases from the exhaust outlet to one side of said absorbent material, an air inlet in said second compartment for admitting cool air to be saturated by passing through said moistened absorbent material and co-mingled with the aforesaid exhaust gases at their point of discharge into said second compartment, and means for delivering said resultant mixture to the fuel intake.

4. A device of the class described including in combination a combustion engine having a fuel intake and exhaust outlet, a container having a relatively large compartment adapted to receive a supply of water, a relatively small compartment communicating with the said large compartment, an absorbent material substantially filling said small compartment and adapted to be moistened by the aforesaid water, a mixing chamber in said small compartment, a pipe extending through said water compartment and the absorbent material for admitting exhaust gases to said mixing chamber from the exhaust outlet, an air inlet in said small compartment for admitting cool air to said absorbent material for saturation with the moisture content thereof and co-mingling with the exhaust gases in said chamber, and means for delivering said co-mingled mixture to the fuel intake.

5. A device of the class described including in combination a combustion engine having a fuel intake and exhaust outlet, a container having a compartment adapted to receive a supply of water, another compartment in said container, an absorbent material in said second compartment, a wick for conveying the water to said absorbent material for moistening the same, a pipe adapted to admit exhaust gases from the exhaust outlet to one side of said absorbent material, a valve in said pipe for regulating the quantity of exhaust gases admitted, an air inlet in said second compartment for admitting cool air to be saturated by passing through said moistened absorbent material and co-mingling with the aforesaid exhaust gases at the point of discharge into said second compartment, a pipe for delivering the resultant co-mingled mixture to the fuel intake, and a valve in said pipe for regulating the quantity of co-mingled mixture admitted.

6. A device of the class described comprising a container having a compartment adapted to receive a supply of water, another compartment in said container, an absorbent material in said second compartment, means for conveying water to said absorbent material from the first mentioned compartment, means for admitting exhaust gases from the exhaust of a combustion engine to said second compartment, means for admitting cool air to said second compartment for saturation with the moisture content of said absorbent material and co-mingling with the aforesaid exhaust gases, and a conduit for delivering the co-mingled mixture to the intake of said engine.

In testimony whereof I affix my signature in the presence of two witnesses.

JOHN L. BLACK.

Witnesses:
MARION TUCKER,
O. H. DUKES.